UNITED STATES PATENT OFFICE 2,320,711

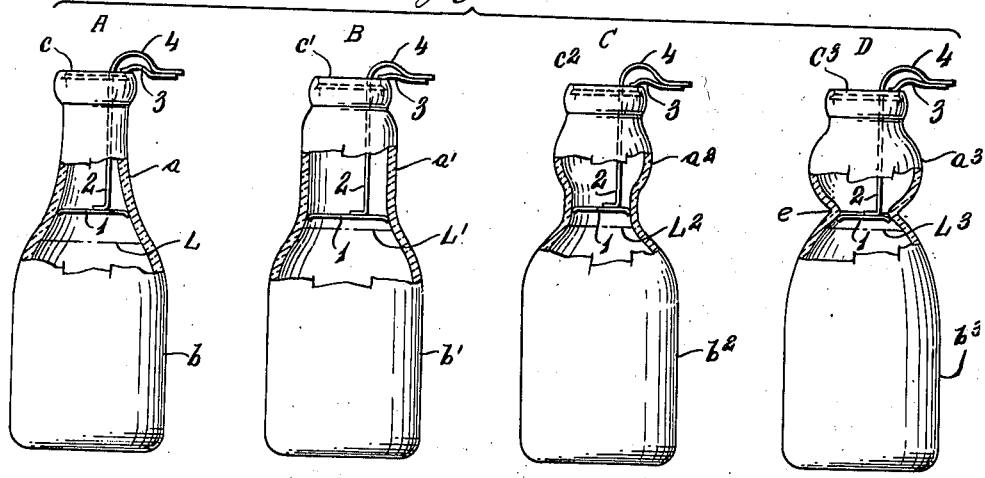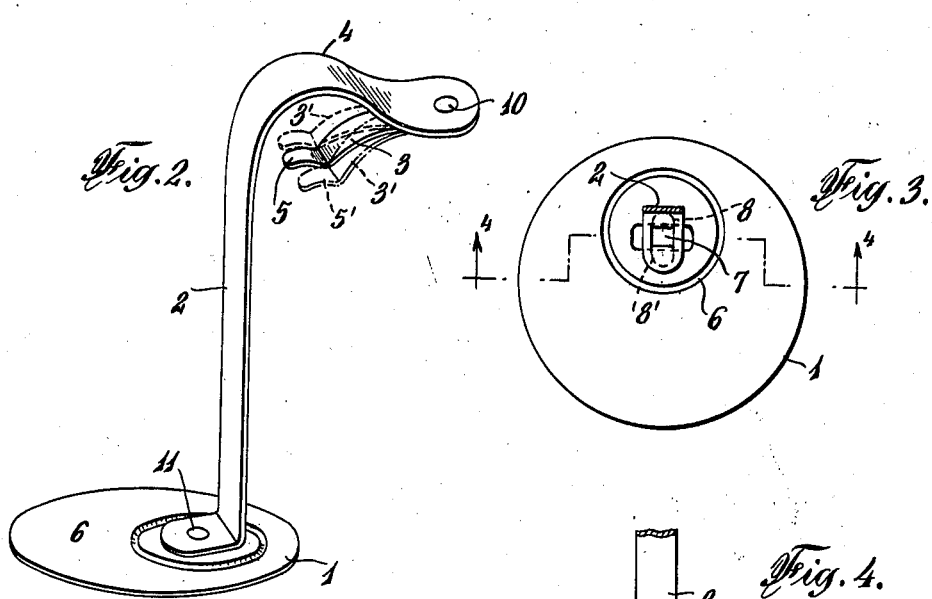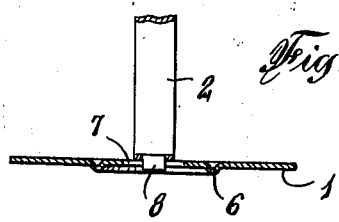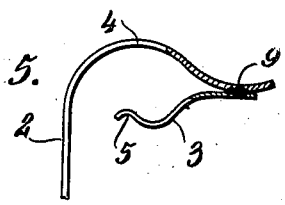

CREAM SEPARATOR DEVICE FOR MILK BOTTLES

Arthur Bramhall, Livingston, N. J.

Application December 9, 1940, Serial No. 369,221

6 Claims. (Cl. 210—51.5)

This invention relates to cream separator devices and has for its object the provision of a device that is adapted for use with the various types of milk bottles now on the market and adapted to provide for the removal of various quantities of cream from a bottle. Another object is to provide an improved cream separator device. Other objects and advantages will be apparent as the device is more fully hereinafter disclosed.

In the retail distribution of milk throughout the country various types of glass milk bottles are employed. State and municipal laws require the milk of different grades to contain a certain minimum of butter fat. Most dairies put out milk with a considerable excess of the minimum requirement so that it is possible to take off from each bottle a considerable portion of the cream at the top of the bottle and have left in the bottle a milk remainder which contains at least the minimum amount of butter fat required by law to be contained in whole milk. The object of the present invention is primarily to provide a cream separator device for use with the different types of milk bottles that will facilitate the separation of desired amounts of the normal cream content of the milk in the bottle. The present invention is essentially an improvement on the invention described and claimed in my co-pending application Ser. No. 258,149 filed February 24, 1939, Patent No. 2,224,533 entitled "Cream separator device."

In said co-pending application I have described and claimed a separator device adapted for use in combination with a two compartment milk bottle. In such a milk bottle the upper or cream compartment is generally of such size relative to the lower or milk compartment as to provide for the segregation therein of substantially all of the cream content of the milk in the bottle and the cream separator device is designed with respect to the bottle to be located in position approximating the normal cream line, thereby to obtain substantially complete separation of the cream from the milk.

In accordance with the present invention means is provided whereby the separator device may be adjustably positioned within the bottle to take off less than the full amount of the cream in the bottle. In addition by varying the size of the spring disc member of the said separator device I am able to adapt the improved device for use with various types of bottles now on the market.

Before further disclosing the present invention reference should be made to the accompanying drawing wherein:

Fig. 1 in four (4) figures (A, B, C and D) illustrates the present invention as it has been adapted and applied to four (4) different types of milk bottles now on the market;

Fig. 2 is a perspective view of the separator device of the present invention;

Fig. 3 is a top view of the spring disc member of the device of Fig. 2, illustrating an improved feature therein;

Fig. 4 is a sectional view along plane 4—4 of Fig. 3, and

Fig. 5 is a sectional view along plane 5—5 of Fig. 2.

Referring to the drawing, the four types of milk bottles shown therein are respectively;

A the standard type of milk bottle having an upper cream chamber $a$ tapering gradually towards the mouth $c$ from the widest diameter of milk chamber $b$, with the cream line L located somewhere along the tapered area of the bottle.

B a modification of the standard type of milk bottle A wherein the upper cream chamber $a_1$ is formed substantially cylindrical and of a diameter approximating that of the bottle mouth $c_1$ and of a total length above the milk chamber $b_1$ as to locate the cream line $L_1$ with milk of usual butter fat content some distance below the upper tapered portion merging the cream chamber $a_1$ with the milk chamber $b_1$.

C is another modification of the standard type of milk bottle A wherein the upper cream chamber $a_2$ is globular in shape and wherein a cylindrical passageway $d$ is provided between the cream chamber $a_2$ and the milk chamber $b_2$ which passageway has a diameter approximating but larger than the diameter of the bottle mouth $c_2$, and wherein the volume enclosed by the globular cream chamber $a_2$ relative to the volumes enclosed by the passageway $d$ and milk chamber $b_2$ is such as to bring the cream line $L_2$ with milk of normal butter fat content somewhere within the cylindrical passageway $d$. This type of bottle is the type to which the cream separator device of my above identified co-pending application is primarily adapted for use.

D this type of bottle is similar to type C above described, except that no interconnecting passageway $d$ is provided, but instead the annular restriction $e$ is provided to form an upwardly facing seat on and against which a special spoon-type separator device may be placed and held in position. Cream line $L_3$ normally being below the annular restriction $e$.

The separator device of the present invention is adapted for use with either of the four (4) bottle types illustrated in Fig. 1 as is evidenced by the drawing. The device comprises a disc member 1 comprised preferably of spring material such as, for example, sheet steel having a diameter approximating but larger than the inside diameter of the bottle at the horizontal level at which cream separation is desired, an arm means 2 secured at one end to the disc member 1 for positioning the disc member horizontally within the bottle, and a spring means 3 on the other end of the arm means 2 to resiliently sustain the disc member 1 in closure position at the desired horizontal level in the bottle.

In the specific embodiment of the present invention illustrated in perspective in Fig. 2, the disc member 1 is shown secured to the end of the arm 2 at a point approximately midway between the axial center and the edge of the disc and substantially at right angles to the longitudinal axis of the said arm member 2. The opposite end of arm $a$ is shown provided with a hook portion 4 extending outwardly from the arm 2 in a direction opposite to the direction of extension of disc 1 therefrom from its point of attachment thereto. The length of hook 4 is selected with respect to the diameter of bottle mouth $c$, $c_1$, $c_2$ and $c_3$ to provide a length sufficient to prevent the device falling through the bottle mouth to the bottom of the bottle A, B, C or D.

By the provision of hook 4 the provision of spring means 3 to resiliently sustain the disc 1 in the desired horizontal position interiorly the bottle, is greatly simplified. In the specific embodiment shown, spring means 3 comprises a spring leaf member having one end secured adjacent the end of hook 4 with the free end extending towards the arm 2 and downwardly towards the disc 1 with the extreme end 5 located in a position to engage the lip of the bottle mouth $c$, $c_1$, $c_2$ or $c_3$. Preferably the said end 5 is provided with a grooved area substantially as shown to seat on said bottle mouth $c$, $c_1$, $c_2$ or $c_3$.

As may be noted, in operation the disc member 1 on being introduced through the bottle mouth $c$ in either of the bottle types A, B, C or D, to the desired horizontal level in the bottle will make edge engagement with the inner surface of the bottle by reason of the fact that the disc diameter approximates but is larger than the diameter of the bottle at this point. By comprising disc member 1 of spring material, spring means 3 when depressed from full line position to any one of the dotted line positions shown in Fig. 2 by engagement with the lip of bottle mouth $c$ operates to resiliently sustain the disc member in edge spring engagement with the inner surface of the bottle by urging the same upwardly, the precise extent of which is controlled by the relative strength of the two spring materials. Normally the strength of spring means 3 should be in excess of the strength of the spring engagement of disc 1.

To facilitate the spring engagement of the disc edge with the inner surface of the bottle and to protect the disc at its point of attachment to arm 2, I preferably provide an annular reinforcing groove 6 surrounding the point of attachment. Groove 6 operates as a focal point for the tensional strains incident to the disc flexing upon edge spring engagement of the disc with the inner surface of the bottle preventing the same from passing to the point of attachment enclosed thereby.

I have found that substantially the same arm length of arm 2 may be employed with each of the bottles A, B, C or D but that due to different bottle diameters at the approximate cream line, different diameter discs must be employed for each type of bottle A, B, C or D. It is therefore preferable to provide means to detachably secure the disc member 1 to the end of arm 2 instead of permanently secured as by rivet 11 (Fig. 2), so that the same may be readily adapted for use with either type bottle. This is most conveniently accomplished as is illustrated in Figs. 3 and 4 by providing disc 1 with an oval opening 7 at the point of attachment and by providing the end of arm 2 with oppositely extending ears 8—8' for passing through the oval opening so that on rotation of the disc 1 to a position bringing the oval axis at right angles to the ear axes, the disc is secured on the arm end. Such a securing means is old, per se, except in the combination herein disclosed.

As indicated in Fig. 5 spring means 3 may be spot welded to hook end 4 at the point 9 instead of riveted at 10 in Fig. 2 without essential departure from the present invention.

From the above description and the drawing it is believed apparent that many modifications may be made in the cream separator device of the present invention without essential departure therefrom and all such departures and modifications are contemplated as may fall within the scope of the following claims.

What I claim is:

1. A cream separator device for milk bottles comprising a disc member comprised of spring material and having a size and diameter approximating but larger than the cross-sectional area of the bottle at the approximate level for cream separation, an arm member having one end secured to the said disc member at a point intermediate the center and edge of the said disc member, said arm member extending upwardly therefrom along a plane substantially normal to the surface of the said disc member, a hook end on the opposite end of the arm member, said hook end extending outwardly from the arm axis in a direction opposite to the direction of extension of said disc member therefrom, and a spring leaf member on the underside of said hook member having one end secured thereto at a point adjacent the hook end with the free end thereof extending towards the said arm and downwardly towards the said disc member with the end of the spring lying in a position to engage the lip of the bottle mouth upon the insertion of the disc member within a milk bottle.

2. The separator device of claim 1, means to detachably secure the said disc member to the said arm end.

3. The separator device of claim 1, wherein said disc member is provided with an annular reinforcing rib enclosing the point of attachment of said arm thereto.

4. The separator device of claim 1, wherein the end of said spring leaf member is provided with a bent portion adapting the same to seat upon and to engage the lip of the bottle mouth.

5. The separator device of claim 1, wherein the length and size of said hook member is adapted to prevent the separator device from falling through the said bottle mouth.

6. A cream separator device for a milk bottle comprising a disc member comprised of metallic spring material, an arm member having one end secured to said disc member at a point of attachment lying between the axial center and the disc edge and the opposite end terminating in a hook portion extending outwardly from the arm in a direction opposite to the direction of extension of said disc member therefrom, with the said disc and hook lying in planes substantially at right angles to the longitudinal axis of said arm and with a length of arm therebetween approximating the maximum depth of insertion of said disc in a milk bottle, and a spring means on the underside of said hook to engage the mouth of a bottle thereby to resiliently sustain the said disc at a desired horizontal level in said bottle.

ARTHUR BRAMHALL.